March 27, 1962 W. E. BRIGGS 3,026,715
LEAK DETECTOR TEST TABLE
Filed Jan. 3, 1961 2 Sheets-Sheet 1
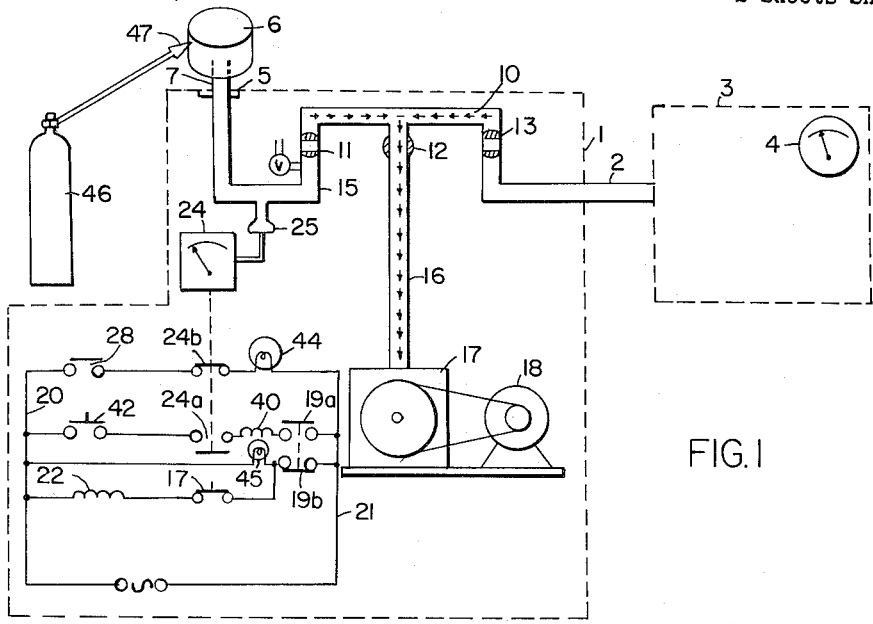
FIG.1
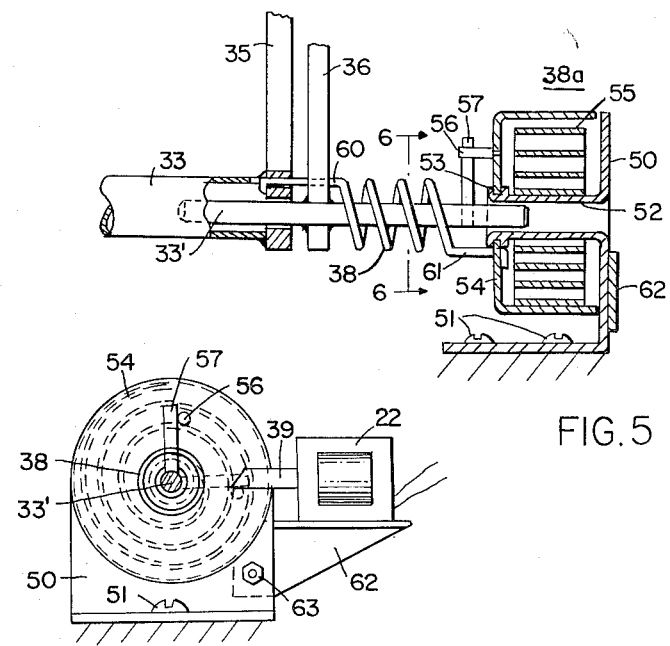
FIG.5
FIG.6
INVENTOR.
WALTON E. BRIGGS
BY
Irving M. Freedman
HIS ATTORNEY March 27, 1962 W. E. BRIGGS 3,026,715
LEAK DETECTOR TEST TABLE
Filed Jan. 3, 1961 2 Sheets-Sheet 2
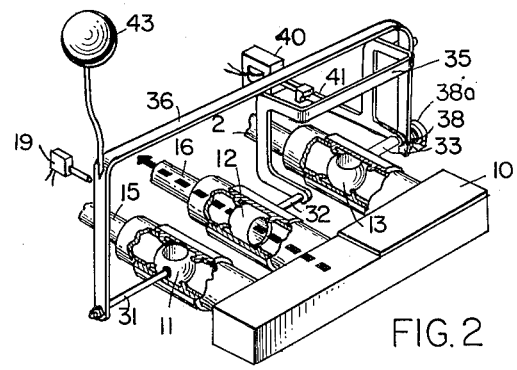
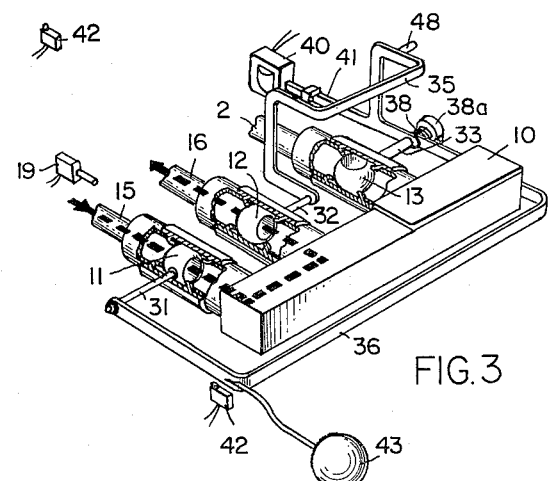
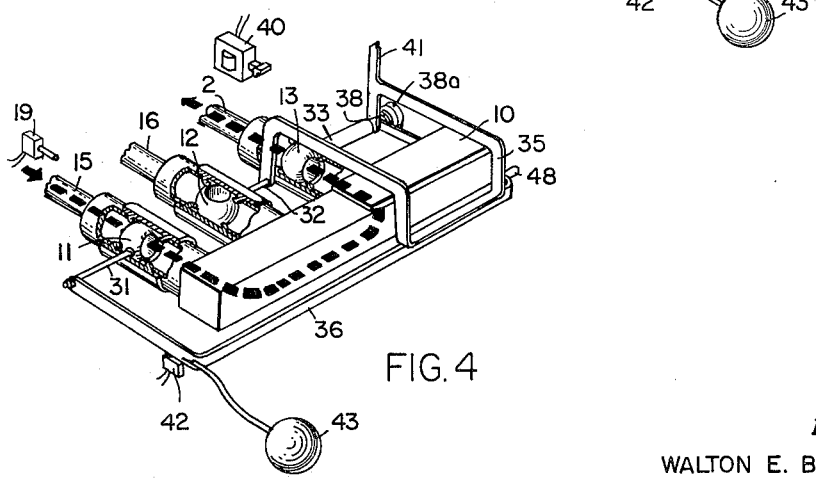
*INVENTOR.*
WALTON E. BRIGGS
BY
Irving M. Freedman
HIS ATTORNEY

United States Patent Office

3,026,715
Patented Mar. 27, 1962

3,026,715
LEAK DETECTOR TEST TABLE
Walton E. Briggs, Lynnfield, Mass., assignor to General Electric Company, a corporation of New York
Filed Jan. 3, 1961, Ser. No. 80,430
6 Claims. (Cl. 73—40.7)

The subject invention relates to an improved leak detector test table, and more particularly, to a semiautomatic test table for use in vacuum leak testing.

It is known to test various enclosures for leaks by evacuating the enclosure, connecting it to a leak detector responsive to the presence of a particular tracer gas and probing the exterior of the enclosure with a jet of the tracer gas to determine if tracer gas is drawn through leaks in the surface of the enclosure to the leak detector. The leak detector may be either of the mass spectrometer type responsive, for example, to a helium tracer or may be of the halogen type responsive to a tracer gas of the halogen family. In assembly line leak testing procedures it is important that means be provided to facilitate the evacuation of the enclosure or test sample and subsequent connection to the leak detector when the vacuum has attained a suitable value. It is desirable that in the event of accidental loss of vacuum the leak detector be immediately isolated to prevent disastrous pressure rise therein. Since it is desirable that relatively expensive leak detector equipment be operable by technically inexperienced personnel, it is also desirable that a fast, foolproof test table be provided which production workers can use effectively after a minimum of instruction without the possibility that a false move will damage the equipment or cause a delay. It is also desirable that the test table be relatively uncomplex, inexpensive, and easy to fabricate and maintain.

While solenoid type valves may appear to be desirable in semiautomatic or automatic valving operations, a common difficulty experienced with such valves is an occasional failure to close vacuum tight. While slight leakage may be tolerated in many test procedures, in a leak detector it is most troublesome since any slight vacuum leak in the entire system interferes with the measurement and/or proper operation of the unit. A more reliable and far simpler type of valve is a rotary valve such as the ball type valve which consists essentially of a ball with a hole through it within a housing with a simple 90° rotation of the ball opening or closing the valve. However, the sequential control action of a plurality of ball valves is not readily accomplished as with electrically operated solenoid valve arrangements.

It is an object of this invention to provide an improved semiautomatic leak detector test table which is uncomplex in construction and operation.

It is another object of this invention to provide an improved semiautomatic vacuum leak detector test table utilizing rotary type valves operating in part by stored energy to sequentially connect a test sample from a rough pump to the leak detector in proper sequence and under proper conditions.

It is yet another object of this invention to provide an improved semiautomatic leak detector test table which is reliable and uncomplex in operation and maintenance.

It is still another object of this invention to provide an improved semiautomatic leak detector test table which minimizes the possibility of equipment damage through improper operation thereof by the test operator.

It is a further object of this invention to provide an improved semiautomatic leak detector test table suitable for use in vacuum type leak detector systems.

In accordance with one form of the invention, a leak detector semiautomatic test table is provided comprising a manifold having a first, second and third vacuum valve connecting from the manifold to a test port, a vacuum pump, and a leak detector, respectively. The test port includes means to connect the sample being leak tested, the vacuum pump is capable of evacuating the sample being tested, and the leak detector indicates the presence of a tracer gas which enters the vacuum system through a leak in the sample being tested. Means are provided to sequentially connect the sample being tested to the vacuum pump and to the leak detector when the vacuum has attained a suitable value and include means interconnecting the valves to provide a first position in which the first and third valves are closed while the second valve is open. The second and third valves are rigidly interconnected for joint actuation thereof, and a two-position actuator is provided to open the first valve and provide a second position in which the test port is connected for evacuation through the manifold to the vacuum pump. A vacuum gauge controller, operable when the vacuum reaches a suitable value, actuates the second and third valves to the closed and open position, respectively, through stored energy to provide a third position in which the test sample is connected through the manifold to the leak detector and the vacuum pump is isolated from the manifold for leak testing of the sample. The two-position actuator is shaped such that when actuated back to said first position it drives the interconnecting means between the second and third valves and disconnects the test sample and leak detector from the vacuum pump while connecting the manifold to the vacuum pump.

More particularly, the three vacuum valves are of the rotary quarter-turn, ball type. The ball valves are located side by side and the second and third valves have their balls interconnected by a rigid U-shaped member for simultaneous actuation thereof. The first ball valve includes a manually operable ball actuation member which may be independently actuated from the first to the second position. The second and third valves are spring loaded so as to urge them into the third position, that is, with the second valve closed and the third valve open. The rigid interconnection between the second and third valves is such that when the actuating means of the first valve is reset from the third or test position to the first or load position it drives the interconnecting means with it to simultaneously actuate all valves. A preset emergency spring will drive the valves from the third to the first position on the loss of vacuum in the test sample to isolate the leak detector.

For a better understanding of this invention, reference may be had to the following description taken in combination with the accompanying drawings in which:

FIG. 1 is a schematic representation in block diagram and schematic form of a test table constructed in accordance with the present invention and illustrating the interconnections to the test sample and the leak detector;

FIG. 2 illustrates the valve mechanism in the first or load position in which the manifold is rough pumped;

FIG. 3 illustrates the valve mechanism in the second or test position A in which the test sample is rough pumped to a suitable vacuum;

FIG. 4 illustrates the valve mechanism in the third or test position B in which the sample is connected to the leak detector for leak testing thereof;

FIG. 5 illustrates in more detail the spring bias member shown in the valve actuating mechanism of FIGS. 2–4; and FIG. 6 is a side view in the direction 6—6 of FIG. 5.

Referring to FIG. 1, the semiautomatic test table 1 shown in the first or load position is externally connected via tubing 2 to a mass spectrometer type of leak detector 3 which includes its own vacuum pumping system (not shown) and a leak rate indicator 4 which may comprise an indicating instrument and/or lamp or other alarm. The leak detector 3 indicates the presence of a tracer gas such as helium to which the leak detector is sensitive and which is introduced through the input tubing 2 upon the detection of a leak as discussed in detail below. The test table 1 also includes a test port 5 to which the test sample 6 is coupled through an appropriate coupling or fixture 7. The manifold 10 has three branches associated with the ball valves 11, 12, and 13, respectively. The ball valve 11 is contained within the conduit 15 connecting the manifold 10 to the test port 5. The ball valve 12 controls the test conduit 16 connecting the manifold to the mechanical or rough vacuum pump 17. The ball valve 13 is contained within the conduit or tubing 2 interconnecting the manifold and the leak detector 3. Power is supplied to the motor 18 of the rough pump 17 from a suitable electrical source (not shown). A vacuum indicator and controller 24 is connected to a thermocouple vacuum gauge 25 in the conduit 15 to be responsive to the degree of vacuum to which the test sample 6 is subjected.

The valves 11, 12, and 13 in FIG. 1 are shown in the load or first position. The test sample 6 is connected to the test port 5 via the coupling 7 in a gas-tight manner. The valves 11 and 13 are closed while valve 12 is open connecting the manifold 10 to the rough pump 17.

The valve assembly in the load position of FIG. 1 including the manifold 10, valves 11, 12, and 13, and associated mechanism are shown in more detail in FIG. 2. Referring to FIG. 2, it will be seen that the ball valves 11, 12, and 13 comprise cylindrical housings surrounding spherical balls having axial holes therethrough such that when the holes are aligned with the axis of the associated housing gas may flow therethrough, but when the holes are perpendicular to the axis of the associated housing the gas flow therethrough is cut off. Since the ball of valve 12 is in a position wherein the axial hole is aligned with the housing and test conduit 16, gas is drawn from the manifold 10 through the rough pump 17 through the conduit 16. The balls 11, 12, and 13 are rigidly secured to projecting actuating rod or shaft members 31 and 32 and 33, respectively, which pass through the valve housings to enable the rotation of the balls. The actuating shafts 32 and 33 of valves 12 and 13 are interconnected by a generally U-shaped rigid member 35 for simultaneous actuation of the valves. The actuating rod or shaft 31 of valve 11 which is connected to a substantially U-shaped member 36 which extends from the shaft 31 around the valves 12 and 13 and is supported at the other end for rotation about the actuating shaft 33 of ball valve 13. A spring member 38, provides a bias which tends to rotate the U-shaped bracket 35 of the actuation mechanism of valves 12 and 13 to reverse the operation of valves 12 and 13 when the bracket is in the up position shown in FIG. 3. The spring bias is resisted by a solenoid operated latch member 40 cooperating with an extension member 41 of bracket 35 to hold bracket 35 in the first or load position.

After the test sample 6 has been attached to the test port 5 the actuating member 36 of valve 11 is manually rotated 90° by the operator to the down position by means of handle 43 attached thereto to the second or test position A shown in FIG. 3. Referring to FIG. 3, valve 11 is opened connecting the test sample 6 to the rough pump 17 through the manifold 10 while valves 12 and 13 remain in the open and closed positions, respectively. Actuating member 36 closes a set of normally open contacts of a pressure actuated switch such as a Microswitch 42, which as shown in FIG. 1, is in series with solenoid operated latch member or mechanism 40, normally open contacts 19a of Microswitch 19, and normally open contacts 24a of the vacuum controller 24. The series circuit formed thereby is connected across the power lines 20 and 21. Microswitch 19 is actuated in the positions of FIGS. 2 and 3 through contact with the U-shaped member 36. Thus the latch member 40 will be energized to release member 35 when the vacuum controller 24 is energized upon the attainment of a suitable preset vacuum in the test sample 6.

When the leak sample 6 has been pumped by the rough pump to a suitable preset vacuum, the vacuum indicator and controller 24 is actuated energizing the solenoid operated latch member 40 through the closing of contacts 24a of the vacuum controller. Energization of latch member 40 releases or unlatches the actuating member 35 and the spring 38 rotates the member 35 to the position shown in FIG. 4 wherein the valves 12 and 13 are closed and open, respectively. As shown in FIG. 4, the rough pump is disconnected from the manifold by valve 12 and the test sample 6 is connected through the manifold and through the now open valve 13 to the leak detector. Simultaneously, an indicator lamp 45 lights to indicate that the leak test phase has begun. The lamp 45 is energized by the closing of contact 19b upon the movement of member 36 away from Microswitch 19.

The operator then probes the test sample 6 with a jet of helium supplied from helium tank 46 through the probe assembly 47 as indicated in FIG. 1. When the jet of helium passes over a leak, helium is drawn into the test sample through the leak and the manifold 10 to the leak detector 3 where the leak rate indicator 4 indicates the presence of the helium and of a leak. A leak indication may be accompanied by a light being energized and/or an alarm being sounded.

The test sample 6 having been leak tested, the equipment is returned to the load or first position by merely rotating the actuating member 36 ninety degrees (90°) to the vertical or up position. The actuating member 36 during rotation contacts and drives the actuating member 35 to the up position through contact with pin 48 secured to member 35. The rotation of member 35 to the up position is against the bias of spring 38 to provide the stored energy for the subsequent release of member 35. Member 35 is latched in the vertical or up position by solenoid operated latch member 40. The valve assembly is thus returned to the load position of FIG. 2 and the operator is now ready to repeat the test cycle on a new test sample.

In the event of a gross leak, that is, one so large that the test sample 6 can not be evacuated by the rough pump 17 within a reasonable preset time, a "gross leak" signal lamp is provided to permit faster discovery and rejection of badly leaking test samples. As shown in FIG. 1, the gross leak indicator lamp 44 in series with normally closed contacts 24b of the vacuum controller 24 is connected through the normally open contacts 28 of a timer (not shown) across the power lines 20 and 21. The timer contacts 28 are set to close at a predetermined time in which the test sample 6 should be rough pumped. The actuation of the timer for the beginning of the timer cycle may be accomplished, for example, by the closing of normally open contacts associated with Microswitch 42. Thus, if a gross leak exists and the contacts 28 of the timer should close without the vacuum controller 24 having been actuated through the attainment of a suitable vacuum in the test sample 6, the gross leak indicator lamp 44 will be energized. If the preset vacuum is reached prior to the closing of the timer contacts 28, the vacuum controller 24 will be energized to open the normally closed contacts 27 to prevent the energization of the gross leak indicator 44 upon the closing of the timer contacts 28.

In case of accidental breakage of the test sample or accidental removal thereof during the leak test or test B position of FIG. 4, in which the leak detector is connected directly to the test sample, it is desirable that the boiling oil in the diffusion pump of the mass spectrometer leak detector does not get exposed to atmospheric pressure which would damage it. The conventional pressure gauge and filament protective circuit in the mass spectrometer leak detector 3 may be utilized such that the rapidly rising pressure which closes a contactor to cut off the filament of the leak detector may simultaneously operate an emergency release mechanism to isolate the test sample from the manifold 10 through the action of member 36 and associated valve 11 and to return the equipment to the load position of FIG. 2.

The emergency release mechanism includes an emergency spring member 38a, which as shown in FIGS. 5 and 6, is positioned adjacent shaft 33′ of actuator 36 beside spring member 38. The spring 38a includes a fixed member 50 which is secured relative to the valve assembly by screws 51 and forms the back plate of the spring enclosure. A central tubular extension 52 of the member 50 forms a journal bearing for one end of the shaft 33′. The end of the extension 52 remote from the back plate includes a circumferential groove 53 in which the cover member 54 is rotatably mounted. Spiral spring 55 is positioned within the region defined by cover 54 and back plate 50 with the outer end thereof fixedly secured to the rotatable cover and the inner end fixedly secured to the extension 52. Thus, rotation of the cover member will "cock" the spring. A pin or projection 56 extends from the cover 54 parallel to shaft 33 and a radially extending actuator pin 57 is positioned such that subsequent to operation of the emergency spring 38a rotation of the actuator member 36 from the load position of FIG. 2 to the position of FIG. 3 will by the rotation of shaft 33′ and cover member 54 through the cooperation of pins 56 and 57 cock the emergency spring. The emergency spring is retained in the cocked position by the clockwise rotation of actuator pin 56 (as shown in FIG. 6) into engagement with the release member 39 of the emergency solenoid 22 mounted adjacent to the spring 38a on support member 62 which is in turn secured to back plate 50 by fastening means 63.

The emergency spring will remain in the cocked position until released by the energization of solenoid 22 upon a sudden pressure rise in the leak detector 3. The solenoid 22 as shown in FIG. 1 is connected through the normally closed contact 19b of Microswitch 19 and the normally open switch 17 associated with the conventional pressure gauge and filament protective circuit of the mass spectrometer 3. Thus, if the actuator member 35 is in the position of FIG. 4, that is, if the leak detector 3 is connected to the test sample 6, the Microswitch 19 is closed and upon the occurrence of a sudden pressure rise in the leak detector which may be occasioned by the breaking of the test sample, solenoid 22 is energized releasing the spring 28a to drive actuator member 36 and through member 48 drive actuator 35 to return the valves to the load position of FIG. 2, isolating the mass spectrometer leak detector.

It is desirable to have the emergency spring action as fast as possible. The action is speeded up and made more positive through an arrangement in which the spring 38a is not opposed by spring 38 during emergency action. This is accomplished as shown in FIGS. 5 and 6 by securing the spring 38 which is rotatably positioned around shaft 33 at one end 60 to the actuator 35 and at the other end 61 to the cover member 54. Since during the emergency release of spring 38a both cover 54 and actuator member 35 rotate, the spring 38 does not oppose the emergency action.

However, with the emergency spring 38a cocked, actuation of actuator 35 from the position of FIG. 4 to the load position of FIG. 2 will flex spring 38 to provide the desirable stored energy for the subsequent automatic release of actuator 35 upon the energization of solenoid operated latch member 40 as described above upon the attainment of a suitable vacuum in the test sample 6.

Thus, it will be seen that in using the subject improved test table the operator need merely attach the test sample 6, rotate the actuating member 36 down to the position shown in FIG. 3 and, after the leak probing and indication, return the member 36 to the first or vertical position.

Safety features are provided in case of accidental breakage of the test sample to protect the leak detector, and a gross leak signal is provided to permit rapid discovery of badly leaking test simples. Thus, a simple yet rapid and effective semiautomatic leak detector test table is provided.

While particular embodiments of the subject invention have been shown and described herein, they are in the nature of description rather than limitation and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. A leak detector semiautomatic test table for use with a vacuum leak detector responsive to particular tracer gases comprising: a manifold, a first, second and third vacuum valve interposed between said manifold and a test port, a vacuum pump, and a leak detector, respectively, said test port including means to connect the sample being leak tested, said vacuum pump being capable of evacuating the sample being tested when connected thereto, and said leak detector being able to indicate the presence of a tracer gas which enters the vacuum system through a leak in the sample being tested, means to sequentially connect the sample being tested to the vacuum pump and to the leak detector when the vacuum has attained a suitable value, said last means comprising means interconnecting said valves to provide a first or load position in which said first and third valves are closed, said second and third valves being rigidly interconnected for joint actuation thereof, a two-position actuator to open said first valve and provide a second position in which said test port is connected for evacuation through said manifold to said vacuum pump, and a vacuum gauge controller operable when the vacuum reaches said suitable value to actuate the second and third valves to the closed and open position, respectively, to provide a third position in which said test sample is connected through said manifold to the leak detector and the vacuum pump is isolated from said manifold for leak testing of the sample, said two-position actuator being shaped and positioned such that when actuated back to said first position it drives the interconnecting means between said second and third valves and disconnects the test sample and leak detector from the vacuum pump while connecting the manifold to the vacuum pump.

2. A leak detector semiautomatic test table for use with a vacuum leak detector responsive to particular tracer gases comprising: a manifold, a first, second and third rotary type vacuum valve interposed between said manifold and a test port, a vacuum pump, and a leak detector, respectively, said test port including means to connect the sample being leak tested, said vacuum pump being capable of evacuating the sample being tested when connected thereto, and said leak detector being able to indicate the presence of a tracer gas which enters the vacuum system through a leak in the sample being tested, means to sequentially connect the sample being tested to the vacuum pump and to the leak detector when the vacuum has attained a suitable value, said last means comprising means interconnecting said rotary valves to provide a first or load position in which said first and third rotary valves are closed while said second rotary valve is open to connect the manifold to the vacuum pump for evacuation thereof, the actuation mechanism of said second and third rotary valves being rigidly interconnected for joint actuation thereof, a two-position actuator to open said first valve and provide a second position in which said test port is connected for evacuation through said manifold to said vacuum pump, a vacuum controller operable when the vacuum reaches said suitable value to actuate the second and third rotary valves to the closed and open position, respectively, to provide a third position in which said test sample is connected through said manifold to the leak detector and the vacuum pump is isolated from said manifold for leak testing of the sample, and means to simultaneously actuate said first, second and third rotary valves to the closed, open and closed condition, respectively, whereby said sequential connection means is reset to said first position.

3. A leak detector semiautomatic test table for use with a vacuum leak detector responsive to particular tracer gases comprising: a manifold, a first, second and third rotary type vacuum valve interposed between said manifold and a test port, a vacuum pump, and a leak detector, respectively, said test port including means to connect the sample being leak tested, said vacuum pump being capable of exacuating the sample being tested when connected thereto, and said leak detector being able to indicate the presence of a tracer gas which enters the vacuum system through a leak in the sample being tested, means to sequentially connect the sample being tested to the vacuum pump and to the leak detector when the vacuum has attained a suitable value, said last means comprising means interconnecting said rotary valves to provide a first position in which said first and third valves are closed while said second valve is open to connect the manifold to the vacuum pump for evacuation thereof, the actuation mechanism of said second and third valves being rigidly interconnected by a rotatable actuator for joint actuation thereof, a two-position rotatable actuator to open said first valve and provide a second position in which said test port is connected for evacuation through said manifold to said vacuum pump, a vacuum controlled operable when the vacuum reaches said suitable value to actuate the second and third valves to the closed and open position, respectively, to provide a third position in which said test sample is connected through said manifold to the leak detector and the vacuum pump is isolated from said manifold for leak testing of the sample, and means to simultaneously actuate said first, second and third valves to the closed, open and closed condition, respectively, whereby said sequential connection means is reset to said first position, said last named means including cooperating portions of said two-position actuator and said rotatable actuator whereby rotation of said two-position actuator to said first position drives and rotates said rotatable actuator.

4. A leak detector semiautomatic test table for use with a leak detector responsive to particular tracer gases comprising: a manifold, a first, second and third rotary type vacuum valve interposed between said manifold and a test port, a vacuum pump, and a leak detector, respectively, said test port including means to connect the sample being leak tested, said vacuum pump being capable of evacuating the sample being tested when connected thereto, and said leak detector being able to indicate the presence of a tracer gas which enters the vacuum system through a leak in the sample being tested, means to sequentially connect the sample being tested to the vacuum pump and to the leak detector when the vacuum has attained a suitable value, said last means comprising means interconnecting said valves to provide a first position in which said first and third valves are closed while said second valve is open to connect the manifold to the vacuum pump for evacuation thereof, the actuation mechanism of said second and third valves being rigidly interconnected for joint actuation thereof, a two-position actuator to open said first valve and provide a second position in which said test port is connected for evacuation through said manifold to said vacuum pump, a vacuum controlled operable when the vacuum reaches said suitable value to actuate the second and third valves to the closed and open position, respectively, to provide a third position in which said test sample is connected through said manifold to the leak detector and the vacuum pump is isolated from said manifold for leak testing of the sample, and means to simultaneously actuate said first, second and third valves to the closed, open and closed condition, respectively, whereby said sequential connection means is reset to said first position, said vacuum controller actuating said second and third valves through a magnetically operated latch mechanism which latches said actuation mechanism of said second and third valves in said first position and which is unlatched by the actuation of said vacuum controller, said actuation mechanism of said second and third valves being rotated when the said latch mechanism is unlatched by a first spring member which tends to drive said actuation mechanism of said second and third valves from the second to the third position.

5. A leak detector semiautomatic test table for use with a vacuum leak detector responsive to particular tracer gases comprising: a manifold, a first, second and third ball type vacuum valve interposed between said manifold and a test port, a vacuum pump, and a leak detector, respectively, said test port including means to connect the sample being leak tested, said vacuum pump being capable of evacuating the sample being tested when connected thereto, and said leak detector being able to indicate the presence of a tracer gas which enters the vacuum system through a leak in the sample being tested, means to sequentially connect the sample being tested to the vacuum pump and to the leak detector when the vacuum has attained a suitable value, said last means comprising means interconnecting said ball valves to provide a first position in which said first and third ball valves are closed while said second ball valve is open, the actuation mechanism of said second and third ball valves being rigidly interconnected by a rotatable actuator for joint actuation thereof, a two-position rotatable actuator to open said first valve and provide a second position in which said test port is connected for evacuation through said manifold to said vacuum pump, a vacuum controller operable when the vacuum reaches said suitable value to actuate the second and third ball valves to the closed and open position, respectively, to provide a third position in which said test sample is connected through said manifold to the leak detector and the vacuum pump is isolated from said manifold for leak testing of the sample, means to simultaneously actuate said first, second and third ball valves to the closed, open and closed condition, respectively, whereby said sequential connection means is reset to said first position, said last named means including cooperating portions of said two-position actuator and said actuation mechanism of second and third ball valves whereby rotation of said two-position actuator to said first position drives and rotates said actuation mechanism of said second and third ball valves, said vacuum controller actuating said second and third valves through a magnetically operated latch mechanism which latches the interconnecting rotatable actuator in said first position and which is unlatched by the actuation of said vacuum controller, said interconnecting rotatable actuator being rotated when the said latch mechanism is unlatched by a first spring member which tends to drive the actuator from the second to the third position, and a second emergency spring member which tends to urge the two-position actuator of said first valve from said third position to said first position wherein said test sample is isolated from said manifold, said urging of said spring member being opposed by a second magnetically operated latch, said second magnetically operated latch being released upon the occurrence of a sudden pressure rise within said test sample through a loss of vacuum, and said first spring member being arranged to exert no force on said interconnecting actuator when in said third position, whereby said actuator members may be quickly driven back to said first position from said third position on the occurrence of a sudden pressure rise to prevent possible damage to said leak detector.

6. A leak detector semiautomatic test table for use with a vacuum leak detector responsive to particular tracer gases comprising: a manifold, a first, second and third rotary type vacuum valve interposed between said manifold and a test port, a vacuum pump, and a leak detector, respectively, said test port including means to connect the sample being leak tested, said vacuum pump being capable of evacuating the sample being tested when connected thereto, and said leak detector being able to indicate the presence of a tracer gas which enters the vacuum system through a leak in the sample being tested, means to sequentially connect the sample being tested to the vacuum pump and to the leak detector when the vacuum has attained a suitable value, said last means comprising means interconnecting said valves to provide a first position in which said first and third valves are closed while said second valve is open to connect the manifold to the vacuum pump for evacuation thereof, the actuation mechanism of said second and third valves being rigidly interconnected by an interconnecting rotatable actuator for joint actuation thereof, a two-position actuator to open said first valve and provide a second position in which said test port is connected for evacuation through said manifold to said vacuum pump, a vacuum controller operable when the vacuum reaches said suitable value to actuate the second and third valves to the closed and open position, respectively, to provide a third position in which said test sample is connected through said manifold to the leak detector and the vacuum pump is isolated from said manifold for leak testing of the sample, means to simultaneously actuate said first, second and third valves to the closed, open and closed condition, respectively, whereby said sequential connection means is reset to said first position, said vacuum controller actuating said second and third valves through a magnetically operated latch mechanism which latches the interconnecting rotatable actuator in said first position and which is unlatched by the actuation of said vacuum controller, said interconnecting rotatable actuator being rotated when the said latch mechanism is unlatched by a first spring member which tends to drive the actuator from the second to the third position, and a gross leak indicator connected in circuit with normally closed contacts of said vacuum controller and the normally open contacts of a timer such that if the timer contacts close prior to a predetermined vacuum being reached which would actuate said vacuum controller to open said normally closed contacts said indicator is energized.

References Cited in the file of this patent

UNITED STATES PATENTS

| | | |
|---|---|---|
| 1,861,542 | McDonald et al. | June 7, 1932 |
| 1,873,602 | Kruse | Aug. 23, 1932 |
| 2,936,611 | Le Mat et al. | May 17, 1960 |